(12) United States Patent
Yamada

(10) Patent No.: US 7,075,731 B1
(45) Date of Patent: Jul. 11, 2006

(54) LARGE APERTURE ZOOM LENS

(75) Inventor: Yasuharu Yamada, Tokyo (JP)

(73) Assignee: Tamron Co., Ltd., Saitama (JP)

( * ) Notice: Subject to any disclaimer, the term of this patent is extended or adjusted under 35 U.S.C. 154(b) by 0 days.

(21) Appl. No.: 11/094,194

(22) Filed: Mar. 31, 2005

(51) Int. Cl.
*G02B 15/14* (2006.01)
(52) U.S. Cl. ..................................... 359/687
(58) Field of Classification Search ................. 359/687
See application file for complete search history.

(56) References Cited

FOREIGN PATENT DOCUMENTS

| JP | 07043613 A | 2/1995 |
|---|---|---|
| JP | 10197794 A | 7/1998 |
| JP | 2000221399 A | 8/2000 |

*Primary Examiner*—Scott J. Sugarman
*Assistant Examiner*—Darryl J. Collins
(74) *Attorney, Agent, or Firm*—Jacobson Holman PLLC

(57) ABSTRACT

The invention is directed to a large aperture zoom lens of the improved optical performance, serving as a standard zoom lens especially suitable to a single-lens reflex camera. The zoom lens employs a zooming system with four groups of lenses having positive, negative, positive and positive refractive powers, respectively, and implements on the order 75 degrees of a photographing angle of field at a wide-angle end of the range, approximately 2.8 of F number throughout the zooming range, and about 2.8 of a variable power of magnification while still dimensioned as close as the standard zoom lens for the single-lens reflex camera (i.e., about 95 mm in total lens length and $\phi$67 mm in filter diameter on the side closer to an objective lens).

24 Claims, 4 Drawing Sheets

LARGE APERTURE ZOOM LENS

FIELD OF THE INVENTION

The present invention relates to a large aperture zoom lens, and more particularly, it relates to a downsized and lightweight large aperture zoom lens serving as a standard zoom lens suitable to various cameras such as a single-lens reflex camera, a video camera, and an electronic still camera, which is approximately 75 degrees in a photographing angle of field at a wide-angle end of the range, about 2.8 in F number throughout the zooming range, and approximately 2.5 in variable power of magnification.

BACKGROUND ART

In the prior art of the invention, a variety of large aperture zoom lens of four or five lens groups have been proposed, and especially, some of them serve as a standard zoom lens suitable to a single-lens reflex camera. Above all, many types of the large aperture zoom lens with a wide angle of 70 degrees or higher are a negative lead zoom lens where a group of lens of negative refractive power leads ahead of the remaining lens groups. A typical one of them is a zoom lens having four groups of lenses of negative, positive, negative and positive refractive powers in the order on the closer-to-the-object first basis, and such zoom lens is large in aperture diameter and still attains the improved performance (for example, Japanese Patent Laid-open Nos. 7-43613 and 2000-221399).

Another type of the large aperture zoom lens proposed in the art is that which has four groups of zoom lenses having positive, negative, positive and positive refractive powers in the order on the closer-to-the-object first basis (e.g., see particularly Japanese Patent Laid-open No. 10-197794). The zoom lens is available from the assignee of this application in the model number 176A (having features of 28 to 105 in focal length and 2.8 in F number).

For recent years, it has been a trend to develop a large aperture zoom lens of a wider angle of field while attaining the more and more improved performance. Some of this type of the large aperture zoom lens takes an inner focusing system where only the second group of lenses are moved for the focusing. This system is advantageous in that, since there is no need of moving more massive and heavier group of lenses like the first lens group, a motor drives the lenses with the reduced burden during the automatic focusing to enable a quick adjustment for the focusing and that an effective diameter of the front lens or the first group of lenses can be retained relatively small, and this effectively leads to the downsizing.

Compared with a general zoom lens in the state of the art, however, the large aperture zoom lens is still bulky and heavy. In addition, as a result of the development of the compact and lightweight single-lens reflex camera body, the prior art large aperture zoom lens is not well-balanced with the camera body and its portability is unsatisfactory. The large aperture zoom lens must receive more luminous fluxes to enhance the brightness in contrast with the standard zoom lens of a comparatively large F number, and this essentially brings about a larger lens diameter. At the same time, the required aberration compensation becomes complicated to necessitate the larger number of lenses, and this increases the total length of the lenses, which adversely leads to increased dimensions of the lens as a whole.

The model Number 176A related to Patent Document 3 has fifteen lenses and four aspherical surfaces. It is 112.0 mm in total length and φ 82 mm in filter diameter when it shrinks in shortest formation. Thus, compared with the standard zoom lens of a relatively high F number (i.e., that belongs to a class that contains lenses 28 to 105 in focal length and 3.5 to 4.5 in F number), the model number 176A is 37 mm longer in total length and 20 mm greater in filter diameter.

The large aperture zoom lenses related to Patent Documents 1 and 2, compared with the model number 176A, have the total length as much as or greater than the total length of the latter in its shortest formation, and this is still bulky. The model number 176A is yet still excessive in dimensions in use for the standard zoom lens as well.

The present invention is made allowing for the aforementioned disadvantages of the prior art large aperture zoom lens, and accordingly, it is an object of the present invention to provide a downsized and lightweight, and highly portable large aperture zoom lens.

It is another object of the present invention to provide a large aperture zoom lens of the improved optical performance, serving as a standard zoom lens especially suitable to a single-lens reflex camera, which employs a zooming system with four groups of lenses having positive, negative, positive and positive refractive powers, respectively, and which implements on the order 75 degrees of a photographing angle of field at a wide-angle end of the range, approximately 2.8 of F number throughout the zooming range, and about 2.8 of a variable power of magnification while still dimensioned as close as the standard zoom lens for the single-lens reflex camera (i.e., about 95 mm in total lens length and φ67 mm in filter diameter on the side closer to an objective lens).

SUMMARY OF TH INVENTION

The present invention provides a large aperture zoom lens comprising four groups of lenses, or first to fourth groups of lenses of positive, negative, positive and positive refractive powers, respectively, in the order on the closer-to-the-object first basis. The zoom lens has its first and second groups of lenses separated farther from each other to widen an air gap between them, its second and third groups of lenses contracted to straighten the air gap between them, and its third and fourth groups of lenses also contracted to straighten the air gap between them during varying the power of magnification from a wide-angle position to a telephoto position, and the groups of lenses are moved toward the object so as to satisfy the conditions as represented in the following formulae:

$$0.18 < |f2|/fT < 0.24 \tag{1}$$

$$1.1 < f1/fT < 1.5 \tag{2}$$

$$0.6 < f4/fT < 0.9 \tag{3}$$

and also the following relation is satisfied relative to a variable ratio of the power of magnification of the whole system from its wide-angle position to its telephoto position:

$$0.57 < Z2/Z < 0.9 \tag{4}$$

where f1 is a focal length of the first group of lenses, f2 is a focal length of the second group of lenses, f4 is a focal length of the fourth group of lenses, fT is a focal length of the whole system at its telephoto position, Z2 is equal to β2T/β2W or a focusing magnification of the second group of lenses at its wide-angle position divided by that of the second group of lenses at its telephoto position (β2T<0 and β2W<0), Z is equal to fT/fW or a focal length of the whole system at its telephoto position divided by that of the whole system at its wide-angle position.

In another aspect of the invention, a large aperture zoom lens comprises four groups of lenses, or first to fourth groups of lenses of positive, negative, positive and positive refractive powers, respectively, in the order on the closer-to-the-object first basis. The first group of lenses include a high refractive lens and a convex meniscus lens in combination in the order on the closer-to-the-object first basis where first and second lens are respectively a laminated lens of high refractive glass and the following third lens is a convex meniscus lens. The second group of lenses include at least an aspherical lens in position closest to the object. The third group of lenses include a low dispersion lens and an aspherical lens in combination where the low dispersion lens has its side closer to the object shaped in positive convex contour and it is followed by a laminated lens of an aspherical lens having its side closer to the object shaped in positive convex contour, another low dispersion lens having its side closer to an imaging plane shaped in positive convex contour, and a convex meniscus lens. The fourth group of lenses include a low dispersion lens and an aspherical lens in combination where the low dispersion lens has its side closer to the object shaped in positive convex contour and it is followed by a laminated lens of an aspherical lens having its side closer to the object in positive convex contour, another low dispersion lens having its side closer to the imaging plane shaped in positive convex contour, and a convex meniscus lens. The zoom lens has its first and second groups of lenses separated farther from each other to widen an air gap between them, its second and third groups of lenses contracted to straighten the air gap between them, and its third and fourth groups of lenses also contracted to straighten the air gap between them during varying the power of magnification from its wide-angle position to its telephoto position, and the groups of lenses are moved toward the object during the variation in the power of magnification.

A large aperture zoom lens comprises four groups of lenses of positive or negative refractive power arranged in series, and the zoom lens has the groups of lenses contracted to come closer to each other during varying the power of magnification from its wide-angle position to its telephoto position for the zooming, while it moves some of the groups of lenses as desired for the focusing. The four groups of lenses consists of first to fourth groups of lenses of positive, negative, positive and positive refractive powers, respectively, in the order on the closer-to-the-object first basis. During the zooming, the zoom lens has its first and second groups of lenses separated farther from each other to widen an air gap between them and its third and fourth groups of lenses contracted to straighten the air gap between them, and the groups of lenses are moved toward the object. In terms of a focal length fT of the whole optical system at its telephoto position, a ratio of f1 to fT ranges approximately from 1.1 to 1.5 where f1 is a focal length of the first group of lenses, a ratio of f2 to fT ranges approximately from 0.18 to 0.24 where f2 is a focal length of the second group of lenses, and a ratio of f4 to fT ranges approximately from 0.6 to 0.9 where f4 is a focal length of the fourth group of lenses, and a ratio of a variable power of magnification of the second group of lenses from its wide-angle position to its telephoto position relative to that of the whole optical system from its wide-angle position to its telephoto position falls in a range approximately from 0.57 to 0.67.

In two of the immediately previous inventions, there are various modifications and variations as described below.

The first group of lenses include a high refractive lens.

The first group of lenses include a convex meniscus lens.

There are two of the lenses or first and second lenses in the first lens group that are respectively a laminated lens of high refractive glass.

The first group of lenses consist of two high reflective laminated lenses and one convex meniscus lens.

The second group of lenses include an aspherical lens on the side closer to the object.

The third group of lenses include a low dispersion lens and an aspherical lens in combination.

The third group of lenses include a low dispersion lens having its side closer to the object shaped in positive convex contour, and a sub-group of an aspherical lens having its side closer to the object shaped in positive convex contour, another lower dispersion lens having its side closer to an imaging plane shaped in positive convex contour, and a convex meniscus lens in combination.

The fourth group of lenses include at least a low dispersion lens shaped in positive convex exterior, and a sub-group of aspherical lenses that include an aspherical lens shaped in negative concave exterior and another aspherical lens shaped in positive convex exterior in combination.

The fourth group of lenses include at least a low dispersion lens having its side closer to the object shaped in positive convex contour and a sub-group of an aspherical lens shaped in negative concave exterior and another aspherical lens shaped in positive convex exterior in combination where the low dispersion lens and the following sub-group of lenses are separated from each other by an air gap defined as desired.

Improved features of the large aperture zoom lens according to the present invention will now be described.

The formula (1) as set forth in Claim 1 is a definition of the ratio of the focal length f2 of the second lens group to the focal length fT of the whole optical system at the telephoto end of the range of the zoom lens. When the ratio exceeds the upper limit as defined in the formula (1), the focal length of the second lens group becomes longer, and this causes the zoom lens to increase a displacement during the variation in the power of magnification, which eventually may cause a difficulty in compensating for aberrations.

The formula (2) is a definition of the ratio of the focal length f1 of the first lens group to the focal length fT of the whole optical system at the telephoto end of the range of the zoom lens. When the ratio exceeds the upper limit as defined in the formula (2), the focal length of the first lens group becomes longer, and this is advantageous in compensating for the aberrations but produces an adverse result of an increase in a displacement of the zoom lens during the variation in the power of magnification, which eventually may cause the total length of the zoom lens to be increased. Reversely, when the ratio exceeds the lower limit as defined in the formula (2), the focal length of the first lens group becomes shorter, and this causes a difficulty in compensating for the various aberrations.

The formula (3) is a definition of the ratio of the focal length f4 of the fourth lens group to the focal length fT of the whole optical system at the telephoto end of the range of the zoom lens. When the ratio exceeds the upper limit as defined in the formula (3), the focal length of the fourth lens group becomes longer, and this is advantageous in compensating for the various aberrations but unavoidably produces an adverse result of an increase in the total length of the zoom lens due to an increase in its back focus as well, which is disadvantageous in downsizing the zoom lens. Reversely, when the ratio exceeds the lower limit as defined in the formula (3), the focal length of the fourth lens group becomes shorter, and this causes the back focus to decrease, which eventually may cause a difficulty in ensuring a mirror driving range in a single-lens reflex camera, for example. This may cause another difficulty in compensating for the various aberrations.

The formula (4) is a definition of the ratio of the variable power of magnification of the second lens group from its wide-angle position of the range to its telephoto position to the variable power of magnification of the whole optical system from the wide-angel end of the range to the telephoto end. When the ratio exceeds the upper limit as defined in the formula (4), the variable power of magnification contributed to the second lens group is increased, and hence, unless the refractive power of the second lens group is enhanced, the displacement of the second lens group is increased, which brings about a difficulty in downsizing the zoom lens. As the refractive power of the second lens group is raised, an aberration variation is increased, and this makes the compensation of the aberrations difficult. Reversely, when the ratio exceeds the lower limit as defined in the formula (4), the variable power of magnification contributed to the third and/or fourth lens group other than the second lens group is increased. Hence, unless the refractive power of these lens groups is enhanced, the displacement of the zoom lens is increased, and this is disadvantageous in downsizing the zoom lens. As the refractive power of the lens groups is raised, the variation in the aberrations is accordingly increased, and this causes a difficulty in compensating for the aberrations.

The formula (5) as set forth in Claim 2 defines relations among the total length of the whole optical system at the wide-angle end of the range (from the foremost lens to the imaging plane), a half angle of view at the wide-angle end, and a filter diameter on the side closer to the object. When the resulted value exceeds the upper limit as defined in the formula (5), the total length of the zoom lens becomes too large relative to an effective diameter of the foremost lens suitable to the predetermined filter diameter on the side closer to the object, and this leads to an insufficient quantity of peripheral light at the wide-angle end of the range. Increasing an effective diameter of the foremost and/or rearmost lens is disadvantageous in downsizing the zoom lens, and raising the refractive power of the first lens group to ensure the sufficient quantity of the peripheral light also leads to the difficulty in compensating for the aberrations. Reversely, the resultant value exceeds the lower limit as defined in the formula (5), the total length of the zoom lens is too short relative to the effective diameter of the foremost lens, and in order to compensate for this, the powers of the lens groups must be excessively raised or the lens thickness and/or the air gap between the lens groups must be further contracted, which causes disadvantages in compensating for the aberrations and in machining the lenses.

The formula (6) as set forth in Claim 3 provides a definition of a distance from the apex of the first lens group on the side closer to the object to the center of the entrance pupil at the wide-angle end of the range. When the distance exceeds the upper limit as defined in the formula (6), the effective diameter of the foremost lens dose to that of the standard zoom lens i.e., φ67 mm of a diameter of a filter on the side closer to the object) brings about an insufficient quantity of peripheral light at the wide-angle end of the range. In order to avoid the adverse effect of the insufficient peripheral light, the effective diameter of the foremost and/or rearmost lens must be increased, which is disadvantageous in downsizing the zoom lens.

The formula (7) as set forth in Claim 4 provides a definition of a magnification of the second lens group for the focusing at the wide-angle end of the range. When the magnification exceeds the upper limit as defined in the formula (7), a displacement of the second lens group is increased during the focusing at the wide-angle end of the range, and hence, it is hard to ensure a sufficient space between the first and second lens groups to let the second lens group move as much as the displacement required for the close-up photographing. Reserving a greater air gap between the first and second lens groups in advance to avoid such a trouble, the total length of the zoom lens and the effective diameter of the foremost lens accordingly increase, and this is also disadvantageous in downsizing the zoom lens. Reversely, when the magnification exceeds the lower limit as defined in the formula (7), an angle of the incident beams from the second lens group upon the third lens group at the wide-angle end is increased, and this greatly varies the spherical aberration due to the third lens group during the focusing, which causes a difficulty in compensating for the aberration.

The formula (8) as set forth in Claim 4 provides a definition of a distance from the apex of the first lens group on the side closer to the object to the front principal point of the same lens group. When the distance exceeds the upper limit as defined in the formula (8), the light beams in the periphery of the picture plane pass points apart from the center area of the aperture at the wide-angle end of the range, and therefore, vignetting or eclipse of the peripheral light is liable to occur at the minimum aperture stop. In order to reserve the diameter of the foremost lens as large as that of the standard zoom lens and let the light beams pass the center of the aperture stop without the vignetting, it is necessary to weaken the refractive power of the first lens group, to raise the refractive power of the second lens group, and/or to decrease a distance between the principal points of the first and second lens groups. When the refractive power of the first lens group is weakened, however, the displacement of the first zoom lens is increased during varying the power of magnification, and this obliges to increase the total length of the zoom lens. Weakening the refractive power of the second lens group brings about a difficulty in compensating for the aberrations. When the distance between the first and second lens groups is decreased, it is hard to ensure a sufficient space between them to let the second lens group move forward by a displacement more than that required for the close-up photographing at the wide-angle end of the range. Thus, in any of these ways deviating from the limits defined in claims of the present invention, it is hard to implement a downsized large aperture standard zoom lens that enables the close-up photographing, as desired to attain the object of the present invention.

The formula (9) as set forth in Claim 4 provides a definition of the maximum distance of the light beams from the optical axis in the plane tangential to the apex of the first lens group closer to the object that is, at the wide-angle end of the range, required to let the light beams pass the periphery of the picture plane without the vignetting, namely, a definition of the effective diameter of the foremost lens at the wide-angle end that is obtained through the paraxial calculation. When the distance exceeds the upper limit as defined in the formula (9), the effective diameter of the foremost lens is to be increased, and such a deviation from the limits defined in the claim leads to a contradiction against the goal of attaining a zoom lens downsized and weight reduced as much as the standard zoom lens for the single-lens reflex camera (φ67 mm in diameter of the filter closer to the object).

BEST MODE OF THE INVENTION

Figure 1:
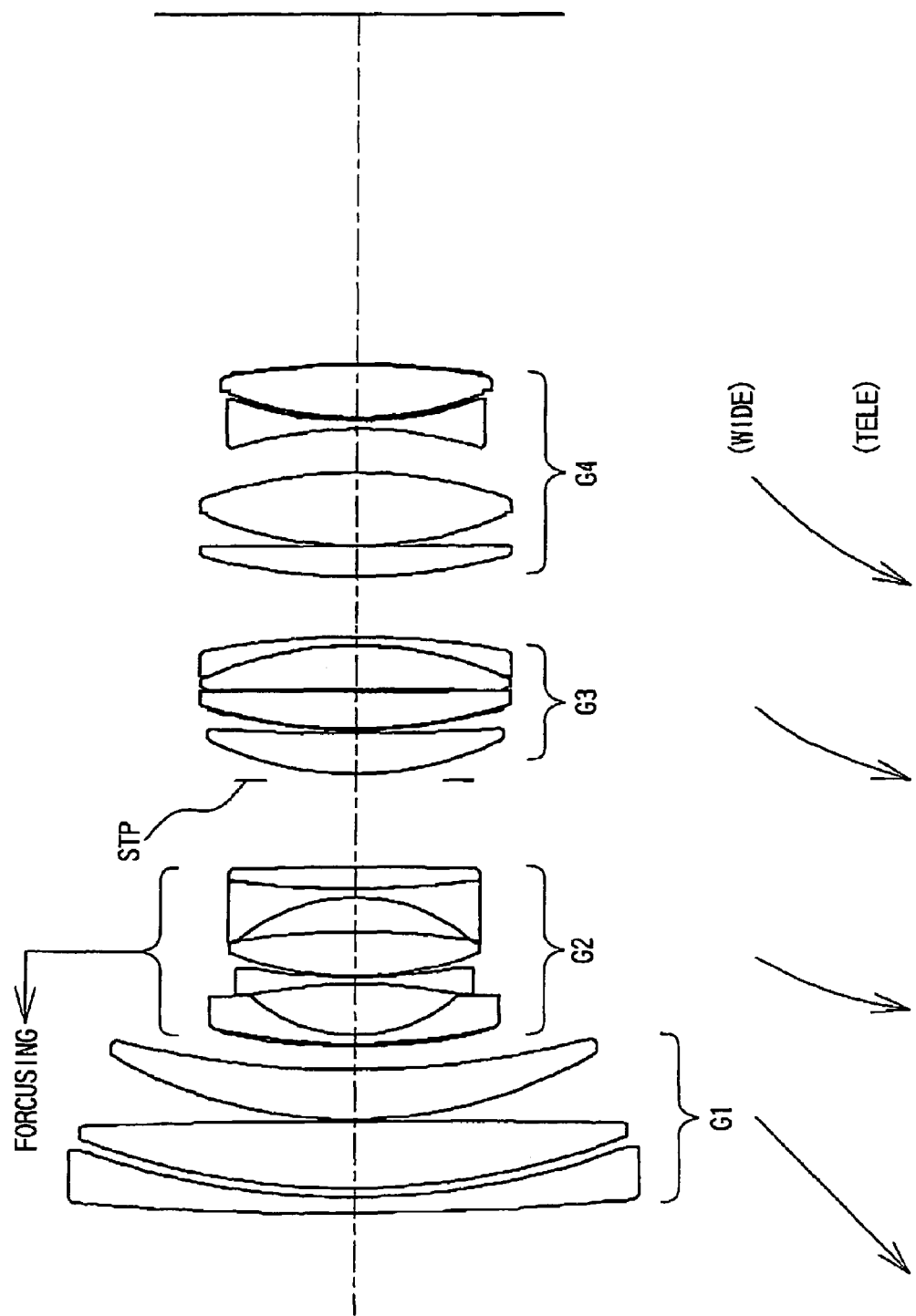
FIG. 1 is a diagram optically illustrating a structure of an exemplary large aperture zoom lens according to the present invention.
Figure 2:
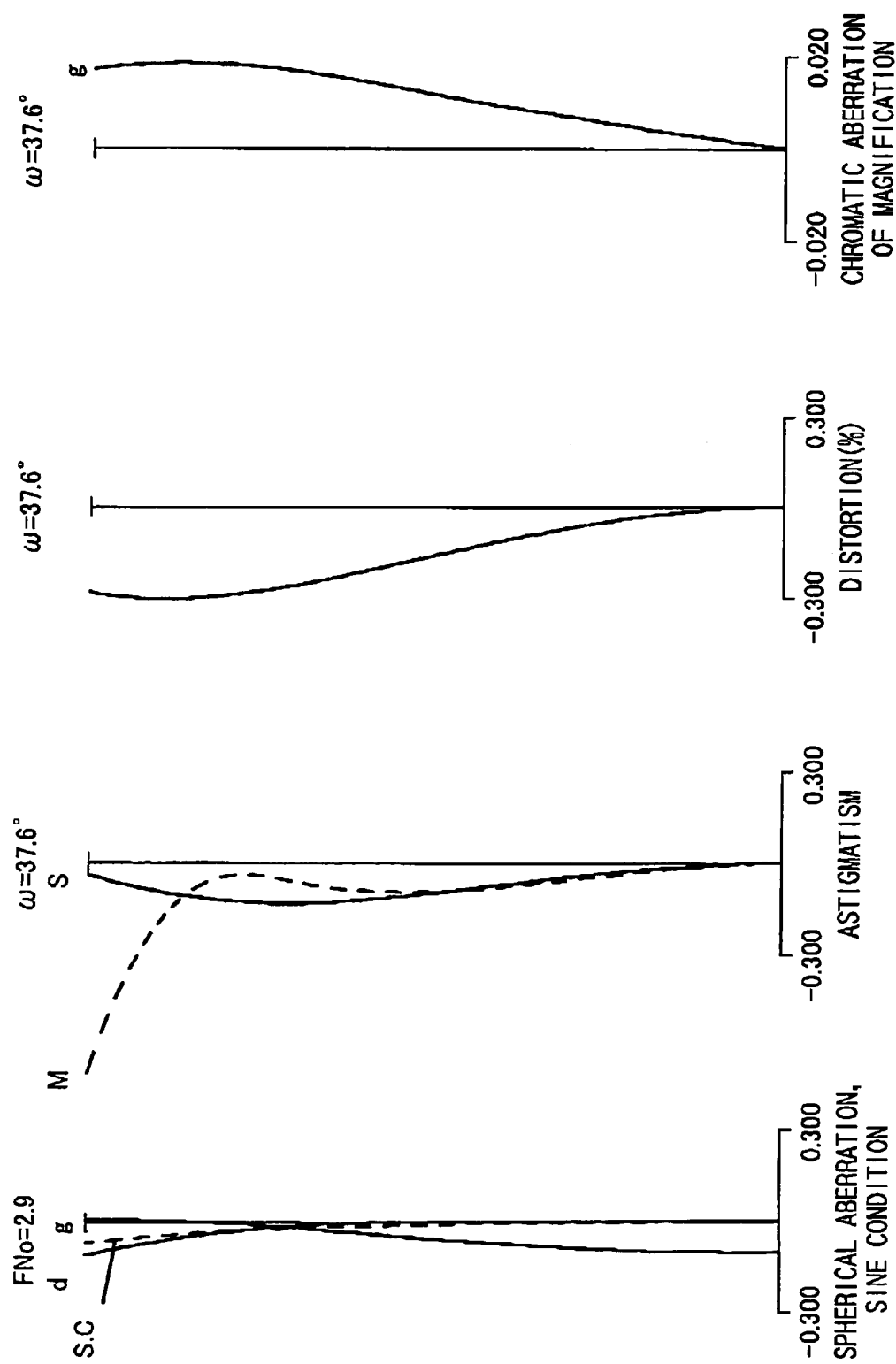
FIG. 2 depicts various types of aberration at a wide-angle end of the range of the zoom lens as shown in FIG. 1.
Figure 3:
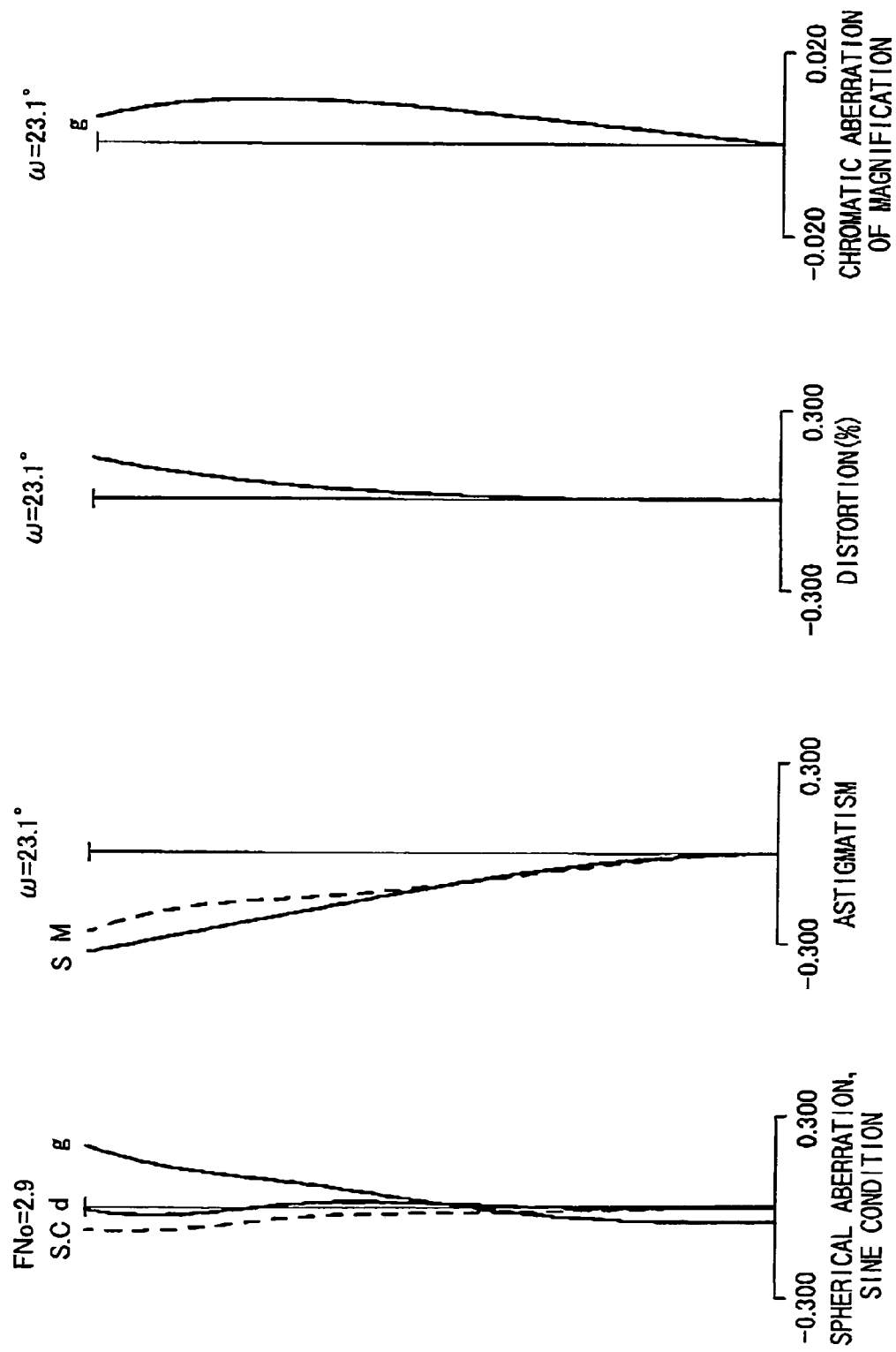
FIG. 3 depicts various types of aberration under the condition of intermediate focal length of the zoom lens as shown in FIG. 1.
Figure 4:
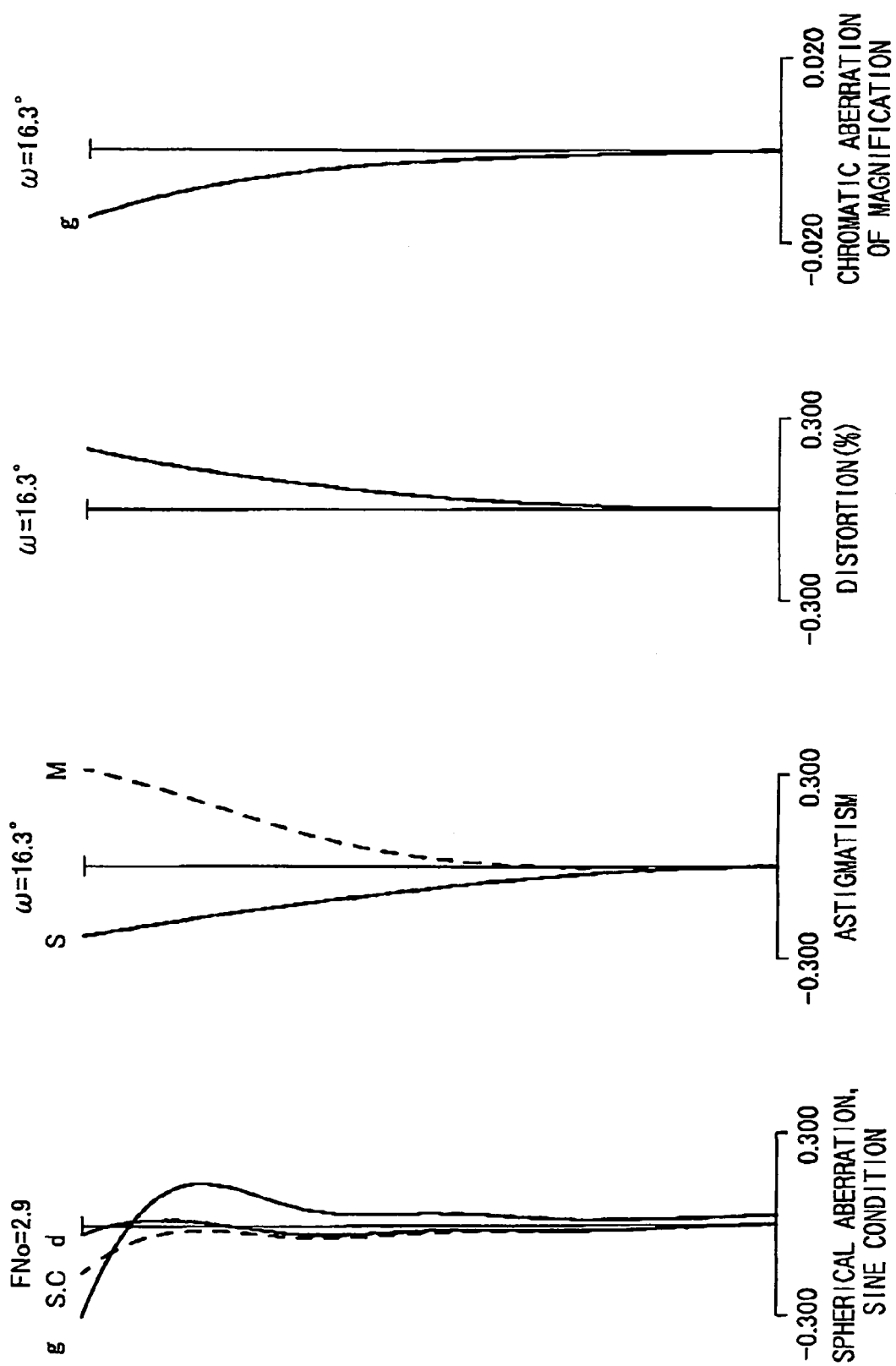
FIG. 4 depicts various types aberration at a telephoto end of the range of the zoom lens as shown in FIG. 1.

An embodiment of a large aperture zoom lens according to the present invention will now be described FIG. 1 is an optical diagram illustrating the exemplary large aperture zoom lens. In FIG. 1, depicted are four groups of lenses including a first lens group G1 of positive refractivity, a second lens group G2 of negative refractivity, a third lens group G3 of positive refractivity, and a fourth group G4 of positive refractivity, along with an aperture stop as denoted by STP. FIG. 2 shows various types of aberration at a wide angle end of the range of the exemplary large aperture zoom lens. FIG. 3 shows various types of aberration under the condition of medium focal length of the exemplary large aperture zoom lens. FIG. 4 shows various types of aberration at a telephoto end of the range of the exemplary large aperture zoom lens. In the graphs of spherical aberration under the conditions as in FIGS. 2 to 4, S.C. denotes a deviation ratio from the sine conditions, d designates spherical aberration of d line, and g denotes the spherical aberration of g line. In the graphs of aspherical aberration, M denotes meridional image astigmatism while S denotes sagittal image astigmatism. The graphs representing distortions use the unit of percentage (%). The graphs showing chromatic aberration of magnification provides g line relative to the d line.

Although this embodiment employs glass lens of high refractive index for the first group of lenses, and in spite of n=1.9689 given in the specifications for the exemplary large aperture zoom lens as given below, the refractive index is not to be limited to the precise value. In general, the "high refractive index" should range as approximately expressed in $n \geq 1.65$ (i.e., the value of n approximating 1.65 ($\approx 1.65$) or greater) for the first and second groups of lenses. Thus, in accordance with the present invention, the "high" refractive index is defined as that of the value equal to or greater than 1.65, and any application with those groups of lenses of the high refractive index failing in this range will be preferable.

Specifications for the exemplary large aperture zoom lens as given below contain parameters designated as f of a focal length, Fno of F number, # of a surface number, r of a radius of curvature of a lens surface, d of a lens thickness plus air gap, n of the refractive index of the d line, and ν of an Abbe constant of the d line, respectively (where λ—587.6 nm for the d line). Some of the surfaces with asterisk * prefixed to their respective surface numbers are aspherical in shape. A formula representing the aspherical shape includes terms a height H of the lens vertical to the optical axis, a displacement X(H) of the height H from the original point or the apex of the lens surface in directions along the optical axis, a paraxial radius of curvature R, a constant of cone ϵ, and a coefficient An of the order of n for an aspherical surface, and it is given as follows:

$$X(H) = (H^2/R)/\{1+[1-(1+\epsilon)\cdot(H^2/R^2)]^{1/2}\} + A4H^4 + A6H^6 + A8H^8 + A10H^{10} \quad (11)$$

Specifications for the Exemplary Large Aperture Zoom Lens
f—28.87~49.98~72.65
Fno—2.91~2.91~2.91

| # | r | d | n | ν |
|---|---|---|---|---|
| 1 | 333.1075 | 1.8 | 1.84666 | 23.8 |
| 2 | 77.6323 | 1.0 | | |
| 3 | 74.5678 | 7.5878 | 1.69680 | 55.5 |
| 4 | −899.7118 | 0.2 | | |
| 5 | 47.0695 | 5.5826 | 1.77250 | 49.6 |
| 6 | 92.1616 | d6 = 2.694~16.985~27.814 | | |
| *7 | 91.4948 | 0.2 | 1.53610 | 41.2 |
| 8 | 60.7311 | 1.0 | 1.80400 | 146.6 |
| 9 | 15.3347 | 5.7 | | |
| 10 | −49.6859 | 0.8 | 1.80400 | 46.6 |
| 11 | 56.8731 | 0.1 | | |
| 12 | 34.3769 | 5.0582 | 1.80518 | 25.4 |
| 13 | −70.7589 | 3.8077 | | |
| 14 | −17.7484 | 1.0 | 1.48749 | 70.2 |
| 15 | 88.8950 | 2.4 | 1.80518 | 25.4 |
| 16 | −400.8377 | d16 = 9.782~3.828~0.985 | | |
| 17 | ∞ (stop) | 0.8 | | |
| 18 | 32.9501 | 4.5533 | 1.49700 | 81.6 |
| 19 | 218.9272 | 0.334 | | |
| *20 | 42.2568 | 0.2 | 1.53610 | 41.2 |
| 21 | 50.5518 | 4.1798 | 1.48749 | 70.2 |
| 22 | 774.1028 | 0.2883 | | |
| 23 | −1096.67 | 4.9331 | 1.49700 | 81.6 |
| 24 | −36.1775 | 1.0 | 1.84666 | 23.8 |
| 25 | −80.5109 | d25 = 6.786~2.409~0.997 | | |
| 26 | 57.8584 | 3.3516 | 1.48749 | 70.2 |
| 27 | 851.4063 | 0.11 | | |
| 28 | 37.524 | 8.2312 | 1.49700 | 81.6 |
| 29 | −46.1404 | 4.8987 | | |
| 30 | 40.8554 | 1.0 | 1.83400 | 37.2 |
| 31 | 34.9959 | 0.2 | 1.53610 | 41.2 |
| *32 | 39.0704 | 0.2 | | |
| 33 | 34.4669 | 5.8463 | 1.58144 | 40.8 |
| 34 | −77.0642 | 0.2 | 1.53610 | 141.2 |
| *35 | −56.7993 | | | |

Coefficient of aspherical surface
r7
$\epsilon$—1.7698
A4=1.51609×10$^{-05}$
A6—−2.40934×10$^{-09}$
A8—−3.81500×10$^{-11}$
A10—−3.90581×10$^{-13}$
r20
$\epsilon$—−0.3805
A4=−1.01321×10$^{-05}$
A6—2.64212×10$^{-10}$
A8—−9.59136×10$^{-12}$
A10—−5.60310×10$^{-14}$
r32
$\epsilon$—−6.2476
A4=2.39974×10$^{-05}$
A6—−2.88771×10$^{-08}$
A8—−1.11697×10$^{-10}$
A10—1.02647×10$^{-12}$
r35
$\epsilon$—12.8865
A4=2.35429×10$^{-05}$
A6—4.67954×10$^{-08}$
A8—1.19880×10$^{-10}$
A10—1.40158×10$^{-13}$ The formulae, which represent various conditions of the aforementioned embodiment of the large aperture zoom lens, are given as follows:

$$|f2|/fT = 0.205 \quad (1)$$

$$f1/fT = 1.329 \quad (2)$$

$$f4/fT = 0.750 \quad (3)$$

$$Z2/Z = 0.621 \quad (4)$$

$$(TLW - 0.5 \times FLT/\tan \alpha W)/fW = 3.124 \quad (5)$$

$$DWENP = 30.11 \quad (6)$$

$$|\beta 2W| = 0.214 \quad (7)$$

$$e0 < 5 = 4.139 \quad (8)$$

$$h1 + e0 \times \tan \alpha W + fW/(2 \times FW) = 27.69 \quad (9)$$

Thus, the present invention effectively brings about a downsized, lightweight, and highly portable large aperture zoom lens.

Moreover, the present invention provides a large aperture zoom lens of the improved optical performance, serving as a standard zoom lens especially suitable to a single-lens reflex camera, which employs a zooming system with four groups of lenses having positive, negative, positive and positive refractive powers, respectively, and which implements on the order 75 degrees of a photographing angle of field at a wide-angle end of the range, approximately 2.8 of F number throughout the zooming range, and about 2.8 of a variable power of magnification while still dimensioned as close as the standard zoom lens for the single-lens reflex camera (i.e., about 95 mm in total lens length and ϕ67 mm in filter diameter on the side closer to an objective lens).

What is claimed is:

1. A large aperture zoom lens
comprising four groups of lenses, or first to fourth groups of lenses of positive, negative, positive and positive refractive powers, respectively, in the order on the closer-to-the-object first basis,
the zoom lens having its first and second groups of lenses separated farther from each other to widen an air gap between them, its second and third groups of lenses contracted to straighten the air gap between them, and its third and fourth groups of lenses also contracted to straighten the air gap between them during varying the power of magnification from a wide-angle position to a telephoto position, and the groups of lenses being moved toward the object so as to satisfy the conditions as represented in the following formulae:

$$0.18 < |f2|/fT < 0.24 \quad (1)$$

$$1.1 < f1/fT < 1.5 \quad (2)$$

$$0.6 < f4/fT < 0.9 \quad (3)$$

and also the following relation being satisfied relative to a variable ratio of the power of magnification of the whole system from its wide-angle position to its telephoto position:

$$0.57 < Z2/Z < 0.9 \quad (4)$$

where f1 is a focal length of the first group of lenses, f2 is a focal length of the second group of lenses, f4 is a focal length of the fourth group of lenses, fT is a focal length of the whole system at its telephoto position, Z2 is equal to β2T/β2W or a focusing magnification of the second group of lenses at its wide-angle position divided by that of the second group of lenses at its telephoto position (β2T<0 and β2W<0), Z is equal to fT/fW or a focal length of the whole system at its telephoto position divided by that of the whole system at its wide-angle position.

2. A large aperture zoom lens according to claim 1, wherein the following formula is satisfied:

$$2.7 < (TLW - 0.5 \times FLT/\tan \alpha W)/fW < 3.3 \quad (5)$$

where TLW is the total length of the whole optical system at the wide-angle end of the range (from the foremost lens to the imaging plane), and FLT is a diameter of the filter attached on the side closer to the object, αW is a half angle of view at the wide-angle end.

3. A large aperture zoom lens according to claim 1, wherein the following formula is satisfied:

$$DWENP < 31 \quad (6)$$

where DWENP is a distance from the apex of the first lens group on the side closer to the object to the center of the entrance pupil at the wide-angle end.

4. A large aperture zoom lens according to claim 1, wherein the following formulae are satisfied:

$$0.15 < |\beta 2W| < 0.3 \quad (7)$$

$$e0 < 5 \quad (8)$$

$$h1 + e0 \times \tan \alpha W + fW/(2 \times FW) < 28 \quad (9)$$

where e0 is a distance from the apex of the first lens group on the side closer to the object to the front principal point of the first lens group; and h1 is a height at which an extension of the primary light beam incident at the half angle of view passes the front principal plane of the first lens group at the wide-angle end of the range, as represented in an additional formula of paraxial calculation:

$$h1 - e1 \times e2 \times \tan \alpha W \times (1/e1 + 1/e2 - \phi 2)/((1 - e1 \times \phi 1) \times (1 - e2 \times 2) - e2 \times \phi 1)$$

where e1 is a distance between the principal points of the first and second lens groups, and e2 is a distance between the principal points of the second lens group and the aperture stop, as respectively represented in additional formulae as follows:

$$e1 - (1 + \phi 2 - \phi 1/\beta 2W)/(\phi 1 \times \phi 2)$$

$$e2 - (1 - hSTP \times 2 \times FW/fW - \phi 1 \times e1) \times \beta 2W/\phi 1$$

and ϕ1 is the refractive power of the first lens group (−1/f1), ϕ2 is the refractive power of the second lens group (−/f2), hSTP is an open diameter of the aperture stop, and FW is an F number at the wide-angle end of the range.

5. A large aperture zoom lens comprising four groups of lenses, or first to fourth groups of lenses of positive, negative, positive and positive refractive powers, respectively, in the order on the closer-to-the-object first basis,
the first group of lenses including a high refractive lens and a convex meniscus lens in combination in the order on the closer-to-the-object first basis where first and second lens are respectively a laminated lens of high refractive glass and the following third lens is a convex meniscus lens,
the second group of lenses including at least an aspherical lens in position the closest to the object,
the third group of lenses including a low dispersion lens and an aspherical lens in combination where the low dispersion lens has its side closer to the object shaped in positive convex contour and it is followed by a laminated lens of an aspherical lens having its side closer to the object shaped in positive convex contour, another low dispersion lens having its side closer to an imaging plane shaped in positive convex contour, and a convex meniscus lens,
the fourth group of lenses including a low dispersion lens and an aspherical lens in combination where the low dispersion lens has its side closer to the object shaped in positive convex contour and it is followed by a laminated lens of an aspherical lens having its side closer to the object in positive convex contour, another low dispersion lens having its side closer to the imaging plane shaped in positive convex contour, and a convex meniscus lens, and the zoom lens having its first and second groups of lenses separated farther from each other to widen an air gap between them, its second and third groups of lenses contracted to straighten the air gap between them, and its third and fourth groups of lenses also contracted to straighten the air gap between them during varying the power of magnification from its wide-angle position to its telephoto position, and the groups of lenses being moved toward the object during the variation in the power of magnification.

6. A large aperture zoom lens according to claim 5, wherein the first group of lenses include a high refractive lens.

7. A large aperture zoom lens according to claim 5, wherein the first group of lenses include a convex meniscus lens.

8. A large aperture zoom lens according to claim 5, wherein there are two of the lenses or first and second lenses in the first lens group that are respectively a laminated lens of high refractive glass.

9. A large aperture zoom lens according to claim 5, wherein the first group of lenses include two high reflective laminated lenses and one convex meniscus lens.

10. A large aperture zoom lens according to claim 5, wherein the second group of lenses include an aspherical lens on the side closer to the object.

11. A large aperture zoom lens according to claim 5, wherein the third group of lenses include a low dispersion lens and an aspherical lens in combination.

12. A large aperture zoom lens according to claim 5, wherein the third group of lenses include a low dispersion lens having its side closer to the object shaped in positive convex contour, and a sub-group of an aspherical lens having its side closer to the object shaped in positive convex contour, another lower dispersion lens having its side closer to an imaging plane shaped in positive convex contour, and a convex meniscus lens in combination.

13. A large aperture zoom lens according to claim 5, wherein the fourth group of lenses include at least a low dispersion lens shaped in positive convex exterior, and a sub-group of aspherical lenses that include an aspherical lens shaped in negative concave exterior and another aspherical lens shaped in positive convex exterior in combination.

14. A large aperture zoom lens according to claim 5, wherein the fourth group of lenses include at least a low dispersion lens having its side closer to the object shaped in positive convex contour and a sub-group of an aspherical lens shaped in negative concave exterior and another aspherical lens shaped in positive convex exterior in combination where the low dispersion lens and the following sub-group of aspherical lenses are separated from each other by an air gap defined as desired.

15. A large aperture zoom lens comprising four groups of lenses of a positive or negative refractive power, and having the groups of lenses contracted to come closer to each other during varying the power of magnification from its wide-angle position to its telephoto position for the zooming while it moves some of the groups of lenses as desired for the focusing, the four group of lenses consisting of first to fourth groups of lenses of positive, negative, positive and positive refractive powers, respectively, in the order on the closer-to-the-object first basis, during the zooming, the zoom lens having its first and second groups of lenses separated farther from each other to widen an air gap between them and its third and fourth groups of lenses contracted to straighten the air gap between them, and the groups of lenses being moved toward the object, and in terms of a focal length fT of the whole optical system at its telephoto position, a ratio of f1 to fT ranging approximately from 1.1 to 1.5 where f1 is a focal length of the first group of lenses, a ratio of f2 to fT ranging approximately from 0.18 to 0.24 where f2 is a focal length of the second group of lenses, and a ratio of f4 to fT ranging approximately from 0.6 to 0.9 where f4 is a focal length of the fourth group of lenses, and a ratio of a variable power of magnification of the second group of lenses from its wide-angle position to its telephoto position relative to that of the whole optical system from its wide-angle position to its telephoto position falling in a range approximately from 0.57 to 0.67.

16. A large aperture zoom lens according to claim 15, wherein the first group of lenses include a high refractive lens.

17. A large aperture zoom lens according to claim 15, wherein the first group of lenses include a convex meniscus lens.

18. A large aperture zoom lens according to claim 15, wherein there are two of the lenses or first and second lenses in the first lens group that are respectively a laminated lens of high refractive glass.

19. A large aperture zoom lens according to claim 15, wherein the first group of lenses include two high reflective laminated lenses and one convex meniscus lens.

20. A large aperture zoom lens according to claim 15, wherein the second group of lenses include an aspherical lens on the side closer to the object.

21. A large aperture zoom lens according to claim 15, wherein the third group of lenses include a low dispersion lens and an aspherical lens in combination.

22. A large aperture zoom lens according to claim 15, wherein the third group of lenses include a low dispersion lens having its side closer to the object shaped in positive convex contour, and a sub-group of an aspherical lens having its side closer to the object shaped in positive convex contour, another lower dispersion lens having its side closer to an imaging plane shaped in positive convex contour, and a convex meniscus lens in combination.

23. A large aperture zoom lens according to claim 15, wherein the fourth group of lenses include at least a low dispersion lens shaped in positive convex exterior, and a sub-group of aspherical lenses that include an aspherical lens shaped in negative concave exterior and another aspherical lens shaped in positive convex exterior in combination.

24. A large aperture zoom lens according to claim 15, wherein the fourth group of lenses include at least a low dispersion lens having its side closer to the object shaped in positive convex contour and a sub-group of an aspherical lens shaped in negative concave exterior and another aspherical lens shaped in positive convex exterior in combination where the low dispersion lens and the following sub-group of aspherical lenses are separated from each other by an air gap defined as desired.

* * * * *